(12) United States Patent
Neely et al.

(10) Patent No.: US 7,530,454 B2
(45) Date of Patent: May 12, 2009

(54) CONVEYOR BELT

(75) Inventors: D. Joseph Neely, Gerrardstown, WV (US); Aaron Brantly Neely, Gerrardstown, WV (US)

(73) Assignee: Ashworth Bros. Inc., Winchester, VA (US)

( * ) Notice: Subject to any disclaimer, the term of this patent is extended or adjusted under 35 U.S.C. 154(b) by 113 days.

(21) Appl. No.: 11/268,730

(22) Filed: Nov. 8, 2005

(65) Prior Publication Data

US 2007/0175738 A1 Aug. 2, 2007

(51) Int. Cl.
*B65G 17/06* (2006.01)
(52) U.S. Cl. .................... 198/853; 198/850; 198/848
(58) Field of Classification Search ......... 198/850–853, 198/848
See application file for complete search history.

(56) References Cited

U.S. PATENT DOCUMENTS

| 254,739 | A | | 3/1882 | Wallis |
| 1,694,746 | A | | 12/1928 | Landahl |
| 1,826,351 | A | | 10/1931 | Hoefen |
| 3,160,264 | A | | 12/1964 | Raybould |
| 3,225,901 | A | | 12/1965 | Heinisch |
| 3,269,526 | A | | 8/1966 | Imse et al. |
| 3,344,907 | A | | 10/1967 | Van Valkenbrugh |
| 3,392,819 | A | | 7/1968 | Waite |
| 3,425,536 | A | | 2/1969 | Shader |
| 3,742,863 | A | * | 7/1973 | Rosenberger, Jr. .......... 198/851 |
| 4,153,152 | A | | 5/1979 | Lapeyre |
| 4,220,052 | A | | 9/1980 | Sheldon |
| 4,250,764 | A | | 2/1981 | Grant |
| 4,438,838 | A | | 3/1984 | Hodlewsky et al. |
| 4,545,098 | A | | 10/1985 | Schroer |
| 4,682,687 | A | | 7/1987 | Leege et al. |
| 4,911,681 | A | | 3/1990 | Funkhouser |
| 4,925,016 | A | * | 5/1990 | Lapeyre ..................... 198/853 |
| 4,953,693 | A | | 9/1990 | Draebel |
| 4,971,191 | A | * | 11/1990 | Lapeyre ..................... 198/853 |
| 5,070,999 | A | | 12/1991 | Layne et al. |
| 5,105,938 | A | | 4/1992 | Tan |
| 5,156,264 | A | | 10/1992 | Lapeyre |
| 5,431,275 | A | | 7/1995 | Faulkner |
| 5,573,106 | A | | 11/1996 | Stebnicki |
| 5,598,916 | A | | 2/1997 | Horton et al. |
| 5,634,550 | A | | 6/1997 | Ensch et al. |
| 5,826,705 | A | * | 10/1998 | Ramsey et al. ............. 198/853 |

(Continued)

OTHER PUBLICATIONS

Scanbelt; J.450, Belt data and Sprocket data; www.scanbelt.com; Feb. 2004; p. 1 of 1.

(Continued)

*Primary Examiner*—James R Bidwell
(74) *Attorney, Agent, or Firm*—Nixon Peabody LLP; Jeffrey L. Costellia

(57) ABSTRACT

A conveyor belt including a plurality of link elements, and a pivot rod with a button head at one end. The button head is sized to pass through an outer opening and be received in a first edge extension when in a particular orientation. The pivot rod is retained with the button head received in the first edge extension by rotating the button head so that the button head is misaligned with respect to the first dimension of the outer opening. A method for assembling a conveyor belt is also provided.

29 Claims, 15 Drawing Sheets

U.S. PATENT DOCUMENTS

| | | |
|---|---|---|
| 5,954,187 A | 9/1999 | Hager |
| 5,960,937 A | 10/1999 | Stebnicki et al. |
| 5,966,923 A * | 10/1999 | Nakamura ................. 198/851 |
| 6,036,002 A | 3/2000 | Kobayashi et al. |
| 6,070,715 A | 6/2000 | Etherington et al. |
| 6,474,464 B1 | 11/2002 | Horton et al. |
| 6,644,466 B2 | 11/2003 | Knott et al. |
| 6,662,938 B2 | 12/2003 | Damkjaer |
| 7,073,662 B2 | 7/2006 | Neely et al. |
| 7,108,127 B2 | 9/2006 | Krisl |
| 2006/0054472 A1 | 3/2006 | Hall |
| 2007/0034486 A1 * | 2/2007 | Montemartini et al. ...... 198/853 |

OTHER PUBLICATIONS

Cambridge, "Spiral Belts"; http://www.cambridge-inc.com; Feb. 6, 2006; pp. 1-2.
KVP Catalog; "Radius 2 Pitch Belting"; pp. 11-4 to 11-5.(Publication date unknown).
Advanced Belting Products, Inc.; "Turn Curve"; http://www.advancedbelting.com; Feb. 6, 2006; pp. 1-6.
International Search Report; International Application No. US06/36210; Dated Feb. 12, 2007.

* cited by examiner

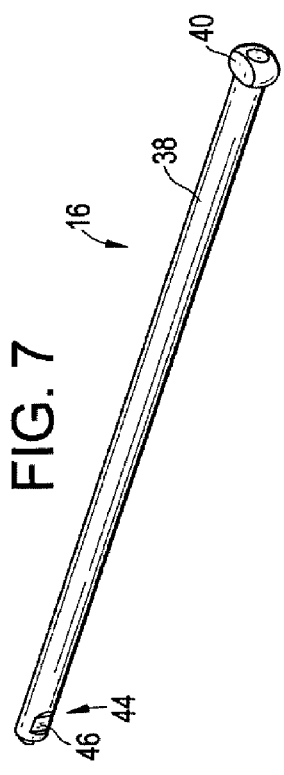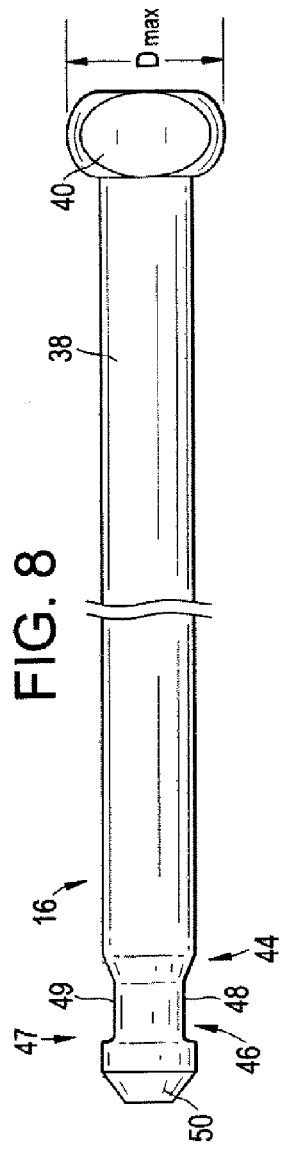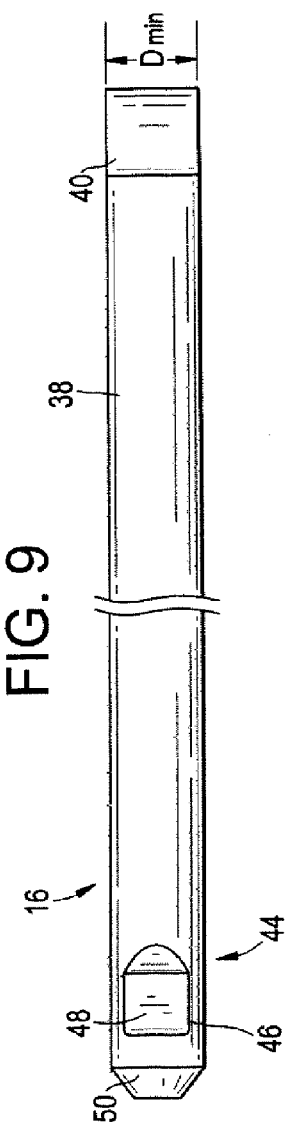

CONVEYOR BELT

BACKGROUND OF THE INVENTION

1. Field of the Invention

The present invention is directed to conveyor belts, and in particular, to modular and grid style conveyor belts. The present invention is further directed to methods for assembling such conveyor belts.

2. Description of Related Art

Conveyor systems are commonly used in various industrial fields for material handling and processing purposes. For instance, conveyor systems are used in food processing systems in which food items are placed on the support surface of a conveyor belt and processed, while being conveyed from one location to another. In such applications, the food items may be cooked, baked, frozen, washed, or subject to other processing steps while being conveyed on the conveyor belt. Various different types of conveyor belts have been used such as wire mesh conveyor belts. Modular belts have become especially popular in food processing systems. Moreover, conveyor systems are often used in a helical accumulator such as that disclosed in U.S. Pat. No. 5,070,999 to Layne et al. which allows storage of a large number of items in the conveyor system.

Many modular conveyor belts include a plurality of link elements, each link element having a plurality of spaced intermeshing extensions that intermesh with extensions of adjacent link elements. The intermeshed link elements are hingeably interconnected together by elongated pivot rods so as to form a continuous conveyor belt, the plurality of link elements providing the conveying surface. The link elements are generally made of a non-metallic material such as plastic, nylon, or other composite materials. The use of such link elements have become popular especially in food processing applications because the conveyance surfaces are easy to clean, and can be treated to resist growth of pathogens such as germs, fingus, viruses and bacteria.

Modular conveyor belts typically rely on an arrangement of modules such that one module arranged with one pitch, is intermeshed with the ends of two abutted modules arranged with a second pitch, in effect joining them to prevent lateral motion of the two abutted modules with respect to each other. This arrangement is repeated at a sufficient number of joints to create a continuous connection between both edges of the conveyor belt, and provide the interconnectivity that holds the opposite edges of the conveyor belt together. The practice of overlapping modules in adjacent pitches is similar to the technique of laying bricks in an overlapping pattern. Therefore, this arrangement of modules is commonly referred to as a brick-laid pattern. The rod typically does not prevent lateral movement of the links other than by joining together the modules. In many cases, the rod has no head or retention features, and is merely trapped by retention features at both edges of the conveyor belt. Examples of conveyor belts having such an arrangement are disclosed in U.S. Pat. Nos. 5,105, 938, 5,156,264, 5,598,916 or U.S. Pat. No. 6,644,466. In some cases two separate rods may be inserted from both sides and snap into the outer edge extensions to prevent escape. However, even in such configuration, brick-laid modules are still required because there is not a continuous rod connecting the edges.

For typical modular conveyor belts, some portion of the modules must be integrally formed with the links to facilitate brick-laying, and therefore, there is little or no flexibility in the selection of overlay patterns or materials without significant investment in new link tooling. In some applications, the links are formed separately, and are configured to mechanically join to the modules to produce the same brick-laying ability as integrally formed links and modules. However, a limitation of such configuration is that it produces undesirable crevices that can harbor pathogens if used for conveying food items.

Grid style conveyor belts typically include intermeshing U-shaped links at both edges of the conveyor belt which are hingeably connected by pivot rods. The pivot rods traverse the width of the conveyor belt, connecting the links at opposite sides and forming the conveying surface. In some cases the surface is modified with metal or plastic overlay to improve product support. Grid style conveyor belts are typically constructed of metal links welded to metal rods. Since the links are joined to the rods in a manner that prevents lateral motion of the link with respect to the rod, brick-laid center modules are not required to maintain the integrity of the belt. However, this type of construction requires cutting, grinding, and welding to separate, join, or repair the belt. In food processing facilities, cleaning and sanitation of the belt is required following repairs of this nature.

Various modular conveyor belts are known in which pivot rods are inserted into intermeshed link elements, the rods being retained by a feature provided on the link elements. For example, U.S. Pat. No. 5,105,938 to Tan noted above discloses a conveyor belt having links that are interdigited and pivotably connected by rods, a belt link end having an aperture with an occlusion to retain the pivot rod in place at one of two bi-stable positions. The patent to Tan discloses a substantially round exit-entrance aperture, and a ridge or waist resiliently formed for holding the pivot rod. However, this patent requires the rods to be moved over the ridge by deforming the ridge which can weaken the links. In addition, inadvertent removal of the rods can occur.

U.S. Pat. No. 5,598,916 to Horton et al. noted above discloses a modular conveyor belt similar to that disclosed above with respect to Tan, except that the modular conveyor belt links of this reference does not include a ridge. The aperture provided on the belt links allows installation and removal of the rod. However, the aperture is offset relative to the rod receiving aperture of the links thereby requiring the insertion of the pivot rods at an angle, or alternatively, requiring the use of a bendable pivot rod, both of these requirements being undesirable.

U.S. Pat. No. 6,644,466 to Knott et al. noted above discloses a platform top radius belt in which the modules include protrusions that extend to support an end of the pivot rod, the protrusion fitting between a projecting portion and a narrow hinge element. This patent discloses that the protrusion includes a notch so as to allow the pivot rod to be inserted into the apertures of the hinge elements. However, the belt disclosed in Knott et al. also does not prevent unintentional removal of the rod.

U.S. Pat. No. 5,156,264 to Lapeyre noted above discloses a pivot rod retention apparatus for conveyor belts including stop members provided on a link. The stop members are displaced during the insertion of the pivot rod, and return to position to retain the pivot rod thereby preventing transverse movement of the pivot rod. The stop members are disclosed as retaining a button head provided on the end of the rod.

U.S. Pat. No. 254,739 to Wallis discloses a pitch chain including a pin with notches that include flattened surfaces. The reference discloses that in assembling the links together, each link is turned at a right angle so that the pin can be inserted. The reference further discloses that when the links are then returned to their operating position, the transverse displacement of the inserted pin is prevented.

The above described conveyor belts propose various methods for assembling a conveyor belt, and a variety of mechanisms for properly retaining a pivot rod. However, there still exists a need for conveyor belts that provide improved, alternative solutions for properly retaining the pivot rods of a conveyor belt. There also exists a need for conveyor belt construction where brick-laid modules is not required, and do not require links to have integrally molded, or mechanically attached module sections. Further, there also exists an unfulfilled need for providing of grid style conveyor belt that is more easily, and inexpensively, repaired, joined or separated in the field.

SUMMARY OF THE INVENTION

In view of the foregoing, one aspect of the present invention is in providing a conveyor belt that allows simple installation of pivot rods.

One advantage of the present invention is that it allows construction of a modular conveyor belt without requiring brick-laid modules.

Another advantage of the present invention is that it provides a conveyor belt that securely retains the pivot rods so that the pivot rods are not unintentionally removed during operation of the conveyor belt.

Still another advantage of the present invention is that it provides a modular conveyor belt that does not require links to have integrally molded, or mechanically attached module sections.

Yet another advantage of the present invention is that it provides a grid style conveyor belt that is more easily and inexpensively repaired, joined or separated in the field.

Another aspect of the present invention is a method for assembling a conveyor belt.

Another advantage of the present invention is that it provides a method for securely retaining pivot rods.

Still another advantage of the present invention is that it provides a method of joining links to rods to prevent lateral movement of the link relative to the rod.

In accordance with one embodiment of the present invention, a conveyor belt is provided including a plurality of link elements, each link element having intermeshing extensions sized to intermesh with intermeshing extensions of an adjacent link element, the intermeshing extensions having transverse rod openings. The conveyor belt also includes a pivot rod received in the transverse rod openings of the plurality of intermeshing extensions, thereby interconnecting adjacent intermeshed link elements together. The pivot rod includes a button head at one end, the button head having a major dimension that is larger than a minor dimension. The conveyor belt further includes a first edge extension having an outer opening with a first dimension that is smaller than the major dimension of the button head, but larger than the minor dimension of the button head so that the button head of the pivot rod passes through the outer opening when the minor dimension of the button head is substantially aligned with the first dimension of the outer opening. The pivot rod is retained in the first edge extension by rotating the button head in the first edge extension so that the minor dimension of the button head is misaligned with the first dimension of the outer opening.

In accordance with one embodiment, the outer opening is positioned on the first edge extension so that the first dimension is substantially perpendicular to the conveyor belt when the conveyor belt is in an operating configuration. In this regard, the outer opening may be implemented as a slot open toward a leading direction of the conveyor belt.

In accordance with one embodiment of the present invention, the conveyor belt further includes a second edge extension including at least one lock mechanism that engages the pivot rod. In this regard, the pivot rod includes a retention feature that is engaged by the lock mechanism that resists rotation of the pivot rod in one embodiment. In one implementation, the retention feature includes at least one groove. In one example embodiment, the groove includes a pair of flattened surfaces diametrically opposed to one another on the pivot rod. In another embodiment of the present invention, the retention feature is a groove encircling the circumference of the pivot rod.

A pair of opposing lock mechanisms are provided in the second edge extension, the lock mechanisms being resiliently spread apart to engage the flattened surfaces of the pivot rod. The lock mechanism allows the pivot rod to slide fore and aft in a direction of conveyor operation. In this regard, the lock mechanism may be implemented as a resilient cantilevered member extending in the second edge extension, the lock mechanism being deflected to engage the pivot rod.

The pivot rod preferably has a length so that the lock mechanism engages the groove of the pivot rod when the button head is received in the first edge extension. The major dimension of the button head on the pivot rod is preferably substantially perpendicular to the flattened surface. Moreover, the transverse rod openings are preferably slotted openings to allow the plurality of link elements of the conveyor belt to be nested together.

In accordance with various embodiments, the button head may be of any appropriate shape so that the major dimension is larger than the minor dimension. In another embodiment, the pivot rod is provided with a button head of any practical size and shape, including but not limited to a circular shape. The conveyor belt is implemented with a first edge extension with an opening sized to allow the button head to pass through the opening. The opening is further positioned to align with the rod openings of two intermeshed link elements when one link element is rotated into a non-operating position. The pivot rod is passed through the opening in the outer edge extension when the links are rotated to a non-operating position. The rod is retained by rotating the links into a normal operating position so that the outer opening is no longer aligned with the button head.

In another embodiment of the present invention, the pivot rod is provided with at least one flat surface along at least the portion of the length of the rod that engages the rod openings of at least one link element. The rod openings are correspondingly sized to prevent rotation of a rod engaged in the rod openings. In yet another embodiment, the pivot rod is provided with a button head and a retention feature at both ends, with the button head sized to allow it to pass through the rod openings of the link elements in at least one orientation.

In accordance with another aspect of the present invention, a method of assembling a conveyor belt is provided including providing a plurality of link elements, each link element having intermeshing extensions with transverse rod openings, and intermeshing the intermeshing extensions of adjacent link elements together. The method includes providing a pivot rod with a button head at one end, the button head having a major dimension and a minor dimension. The method also includes providing a first edge extension having an outer opening with a first dimension that is smaller than the major dimension of the button head but larger than the minor dimension of the button head. The method further includes substantially aligning the minor dimension of the button head with the first dimension of the outer opening, inserting the pivot rod in the transverse rod openings of the intermeshing extensions, and passing the button head of the pivot rod through the outer opening so that the button head is received in the first edge extension. Moreover, the method also includes rotating the orientation of the pivot rod relative to the first edge extension so that the minor dimension of the button head is misaligned with the first dimension of the outer opening.

In accordance with another embodiment, the method further includes resisting further rotation of the pivot rod upon misalignment of the button head relative to the outer opening. Resisting further rotation of the pivot rod may be attained by engaging the pivot rod. In this regard, the method may further include providing a second edge extension with at least one lock mechanism that engages the pivot rod to resist further rotation thereof. In addition, the pivot rod may be provided with a retention feature that is engaged by the lock mechanism. The lock mechanism may be implemented to allow the pivot rod to slide fore and aft while engaging the retention feature to resist further rotation of the pivot rod.

In accordance with still another embodiment of the present method, the pivot rod may be implemented with a length dimension so that the lock mechanism engages the retention feature of the pivot rod when the button head is received in the first edge extension. In one implementation, the retention feature includes a groove with a flattened surface, the major axis of the button head on the pivot rod being oriented substantially perpendicular to the flattened surface. Moreover, in still another embodiment, the lock mechanism may be implemented as a resilient cantilevered member extending in the second edge extension, the lock mechanism deflecting to engage the pivot rod.

These and other features of the present invention will become more apparent from the following detailed description of the preferred embodiments of the present invention when viewed in conjunction with the accompanying drawings.

BRIEF DESCRIPTION OF THE DRAWINGS

FIG. 7 is a perspective view of a pivot rod in accordance with one example implementation.

FIG. 8 is an enlarged top view of the pivot rod shown in FIG. 7.

FIG. 9 is an enlarged side profile view of the pivot rod shown in FIG. 7.

DETAILED DESCRIPTION OF THE PREFERRED EMBODIMENT

Figure 1:
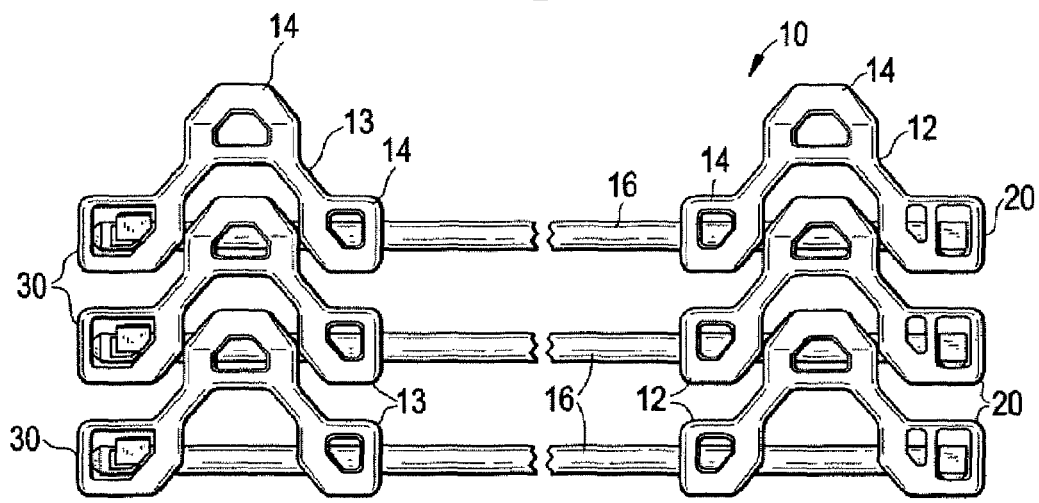
FIG. 1 is a topographical view of a small segment of a conveyor belt in accordance with one example embodiment of the present invention.

FIG. 1 shows a topographical view of a small segment of conveyor belt 10 in accordance with one example embodiment of the present invention. As will be explained in detail below, the pivot rods of the conveyor belt 10 can be easily installed and retained so that the pivot rods are not unintentionally removed during operation of the conveyor belt 10. In addition, the conveyor belt 10 provides a uniquely construction where brick-laid modules is not required, and also does not require links to have integrally molded, or mechanically attached module sections. Moreover, the present invention further allows providing of grid style conveyor belt that is more easily, and inexpensively, repaired, joined or separated in the field.

These advantages are attained by providing an enlarged feature at one end of the pivot rod of the conveyor belt, and a specifically sized opening at an edge extension, that allows the enlarged feature to be received within the edge extension in one orientation, while preventing its removal in another orientation. As explained in the various examples discussed below, the enlarged feature may be a button head of various shapes and configuration, which are received in an opening of an edge extension, and then, rotated therein so that the button head is no longer aligned with the opening and cannot be removed therethough in the rotated orientation.

It should initially be noted that FIG. 1 merely shows a small segment of the conveyor belt 10, and does not illustrate the overlay elements that are typically provided over the pivot rods between the link elements shown. Such overlay elements are commonly implemented as a separate piece in modular conveyor belts. Alternatively, such overlay elements may also be implemented as a continuing portion of the link elements shown. Overlay elements do not form a part of the present invention, and thus, is not illustrated or described herein for clarity purposes.

As shown in FIG. 1, the conveyor belt 10 is provided with a plurality of link elements 12 and 13, each link element having intermeshing extensions 14 that are size to intermesh with intermeshing extension 14 of an adjacent link element. The intermeshing extensions 14 have transverse rod openings that are sized to receive a plurality of pivot rods 16. Thus, the pivot rods 16 interconnect the adjacent intermeshed link elements 12 and 13 together. In this manner, a continuous conveyor belt 10 is provided that may be used to convey objects from one location to another. As will evident from the discussion below, the link elements 12 and 13, and the pivot rods 16 are provided with features that facilitate installation and retention of the pivot rods 16 so as to prevent unintentional removal of the pivot rods during the operation of the conveyor belt 10. Such unintentional removal of the pivot rods can cause the conveyor belt to fail.

As shown in FIG. 1, the conveyor belt 10 in accordance with the illustrated embodiment of the present invention includes link elements 12 having first edge extensions 20, and link elements 13 having second edge extensions 30. The first edge extensions 20 and the second edge extensions 30 are implemented on the corresponding link elements so that they are positioned at the outermost edge of the conveyor belt 10 in the illustrated embodiment. However, it should be noted that the present invention is not limited thereto, and in other embodiments, the first and second edge extensions may be positioned inboard of the outermost edge of the conveyor belt.

Figure 2:
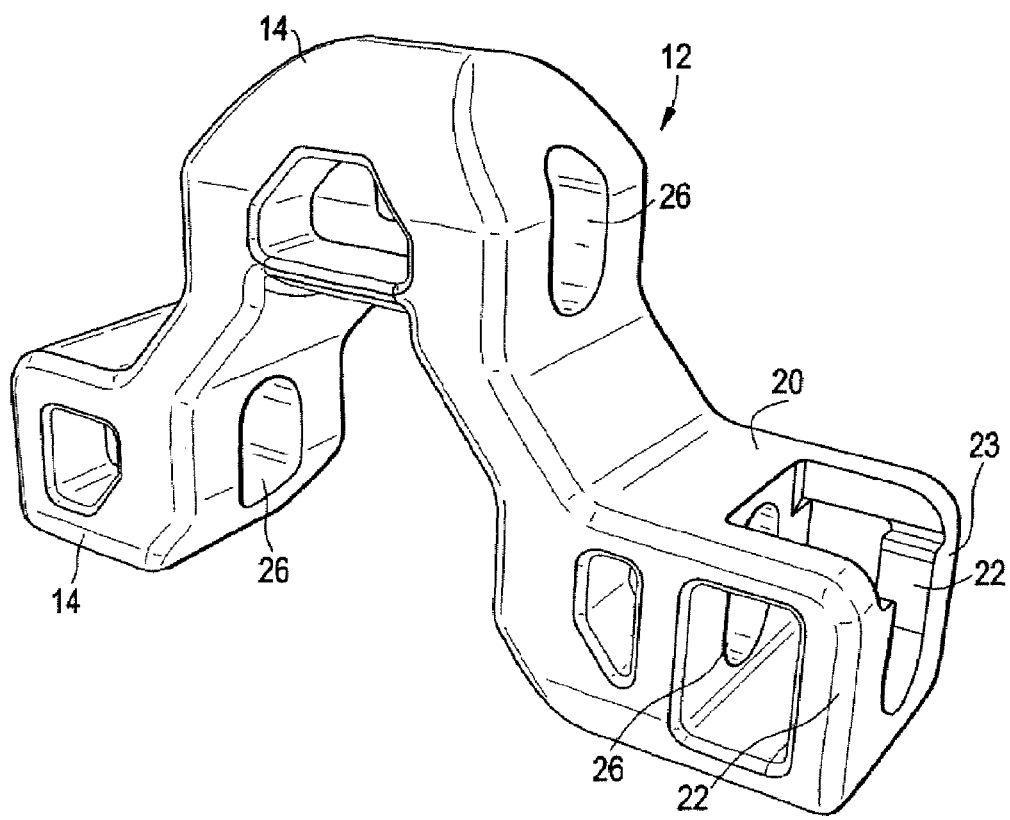
FIG. 2 is an enlarged perspective view of a link element having a first edge extension in accordance with one example implementation of the present invention.
Figure 3:
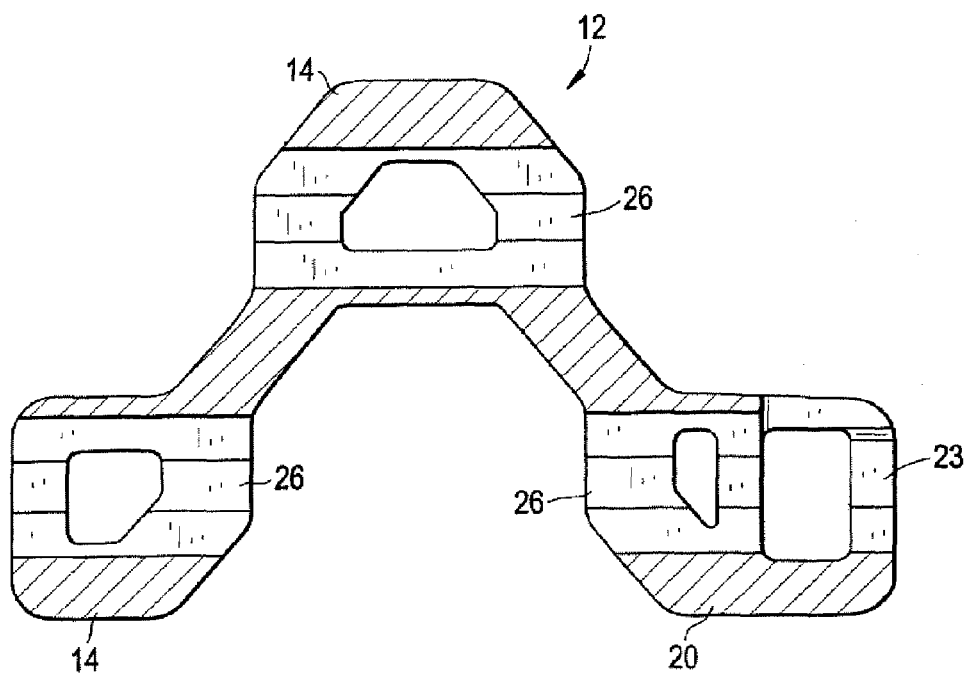
FIG. 3 is a cross-sectional view of the link element shown in FIG. 2.

FIG. 2 shows a link element 12 having the first edge extension 20 in accordance with one embodiment of the present invention. The first edge extension 20 includes an outer opening 22 formed between the edge walls 23 of the first edge extension 20. The outer opening 22 is sized to receive, and retain, the pivot rod 16. In this regard, FIG. 3 is a cross-sectional view of the link element 12 with the first edge extension 20. As shown, transverse openings 26 are provided in the intermeshing extensions 14 of the link element 12 sized to receive the pivot rod 16 to thereby allow interconnecting of adjacent link elements together. The transverse openings 26 of the illustrated embodiment are implemented as slots so as to allow nesting of the plurality of link elements 12 together. This allows the conveyor belt 10 to negotiate turns, and/or be implemented in a spiral storage conveyor.

Figure 4:
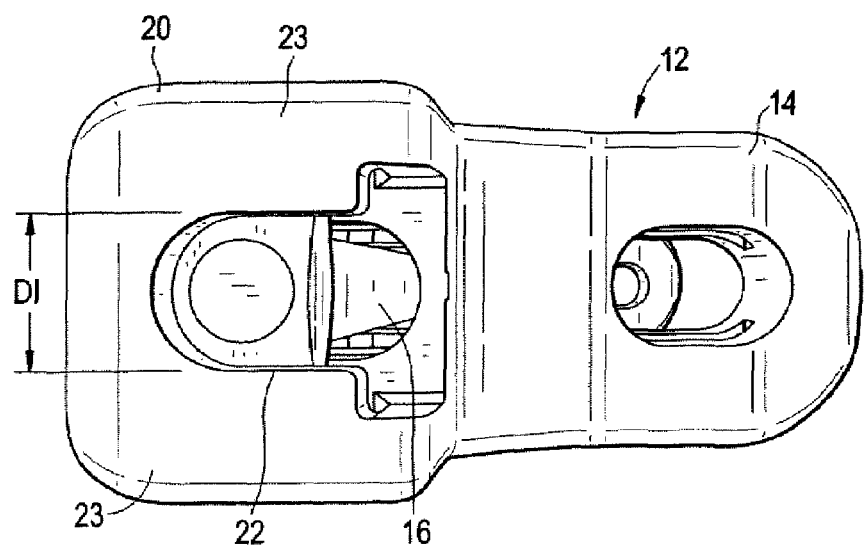
FIG. 4 is an end view of the link element having the first edge extension.

FIG. 4 is an end view of the link element 12 having the first edge extension 20, which clearly illustrates the outer opening 22, and the pivot rod 16 being retained in the first edge extension 20. As can be seen, the outer opening 22 has a first dimension D1. The outer opening 22 is implemented in the illustrated embodiment as a slot or a groove that is open in the leading direction of the conveyor belt 10. The outer opening 22 of the first edge extension 20 is positioned in the present embodiment so that the first dimension D1 is substantially perpendicular to the conveyor belt 10 when the conveyor belt 10 is in an operating configuration. Of course, in other embodiments, the opening need not be implemented as a slot, but may be just an opening extending through the edge wall of the first edge extension.

Figure 5:
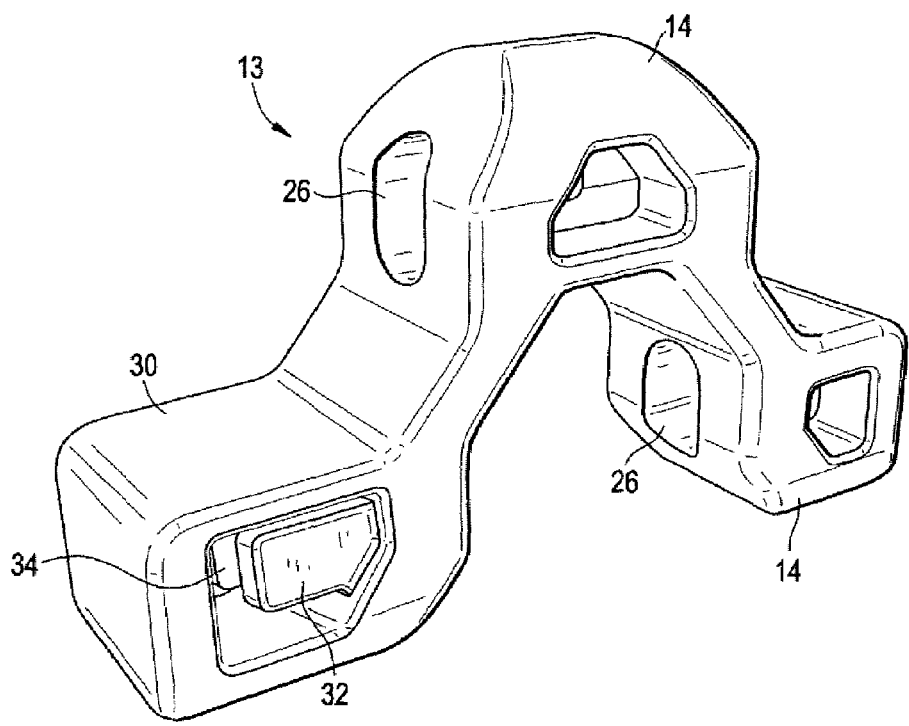
FIG. 5 is a perspective view of a link element having a second edge extension in accordance with one example implementation of the present invention.

FIG. 5 shows a link element 13 having a second edge extension 30 in accordance with one example embodiment of the present invention. As shown, the second edge extension 30 includes lock mechanisms 32 and 34 that are oriented parallel to one anther in the second edge extension 30. The lock mechanisms 32 and 34 are dimensioned to engage the pivot rod 16 in the manner further described in detail below. Of course, the lock mechanisms 32 and 34 may be oriented in any appropriate manner, and not necessarily parallel to one another. However, parallel orientation allows the pivot rod to slid between the lock mechanisms, for example, to allow the conveyor belt to negotiate a turn. In addition, whereas the embodiments disclosed herein are provided with two lock mechanisms, other embodiments may be implemented with only one lock mechanism, or even more than two lock mechanisms.

Figure 6:
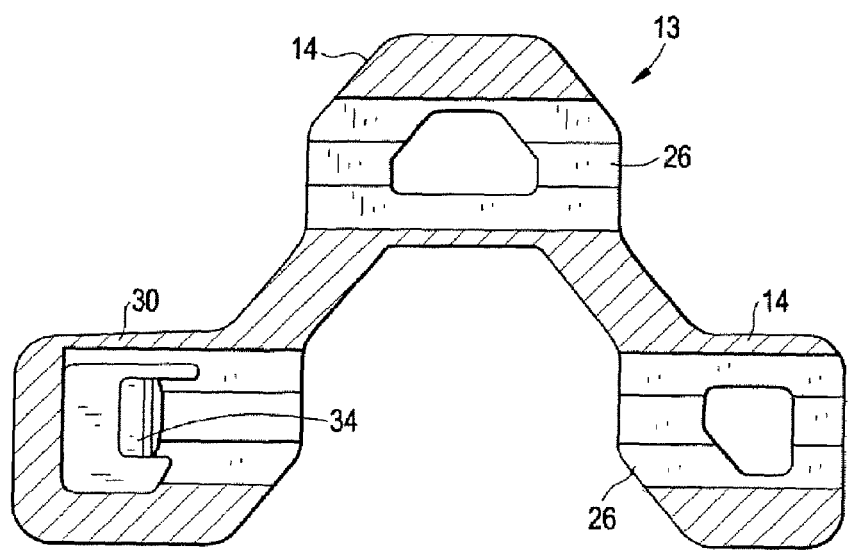
FIG. 6 is a cross-sectional view of the link element of FIG. 5.

FIG. 6 is a cross-sectional view of the link element 13 of FIG. 5 having the second edge extension 30. As shown, the link element 13 is provided with transverse openings 26 that are sized to receive the pivot rod 16 therein. As most clearly shown in FIG. 6, the lock mechanism 34 (and lock mechanism 32) are implemented in the present embodiment as resilient cantilevered members extending within the second edge extension 30. In this regard, the second edge extension 30 maybe formed from various types of steel, such as spring steel, a formable plastic or other resilient material so that the lock mechanisms can be deflected when engaging the pivot rod 16. It should be noted that whereas in the illustrated embodiment, the second edge extension 30 is provided with two lock mechanisms 32 and 34, the present invention is not limited thereto. In other embodiments, a different number of lock mechanisms may be provided, for example, a single lock mechanism.

FIG. 7 shows a perspective view of the pivot rod 16 in accordance with one example implementation thereof. The pivot rod 16 includes an elongated shank 38, a button head 40 at one end of the elongated shank 38, and a retention feature 44 at the other end of the elongated shank 38. As clearly shown in the top and side views of FIGS. 8 and 9, respectively, the illustrated embodiment of the button head 40 has a major dimension $D_{maj}$ and a minor dimension $D_{min}$ as measured perpendicular to the outer peripheral surface of the elongated shank 38. The major dimension $D_{maj}$ is larger than the minor dimension $D_{min}$, and in the illustrated embodiment, the $D_{min}$ being the same as the outer peripheral surface of the elongated shank 38. The outer opening 22 of the first edge extension 20 of link element 12 and the button head 40 of the pivot rod 16 are dimensioned in conjunction with one another so that the major dimension $D_{maj}$ of the button head 40 is larger than the first dimension D1 of the outer opening 22, but the minor dimension $D_{min}$ of the button head 40 is smaller than the first dimension D1 of the outer opening 22. It should also be appreciated from the discussions below that the geometric shape of the button head 40 can be varied, and the button head 40 may have any appropriate shape which allows it to function in the manner described herein below. For example, the button head may be implemented with a square or rectangular shape, or be implemented with an eccentric feature shaped in a manner similar to a cam lobe.

The retention feature 44 of the pivot rod 16 is implemented in the present embodiment to be engaged by the lock mechanisms 32 and 34 of the second edge extension 30 as described above, so as to resist lateral movement of the pivot rod 16, and also optionally, to resist rotation of the pivot rod 16. In the illustrated implementation of the pivot rod 16, the retention feature 44 includes grooves 46 (only one being shown in FIGS. 7 and 9). The grooves 46 and 47 of the pivot rod 16 are most clearly shown in the top view of FIG. 8. In this regard, the grooves 46 and 47 of the illustrated embodiment are implemented with flattened surfaces 48 and 49 that are diametrically opposed to one another on the pivot rod 16 that function to resist rotation of the pivot rod 16 when engaged by the lock mechanisms 32 and 34 of the second edge extension 30. Of course, in other embodiments, the groove may be any number of such flattened surfaces, or may even be an annular grove that circumscribes the peripheral surface of the pivot rod 16.

Furthermore, the pivot rod 16 of the illustrated embodiment is also provided with a chamfer 50 as most clearly shown in FIGS. 8 and 9. The chamfer 50 facilitates installation of the pivot rod 16 into the second edge extension 13. In particular, the chamfer 50 facilitates the deflection of the lock mechanisms 32 and 34, i.e. spreading the lock mechanisms 32 and 34 apart, so that the pivot rod 16 can be received therebetween as described in further detail below.

Figure 10:
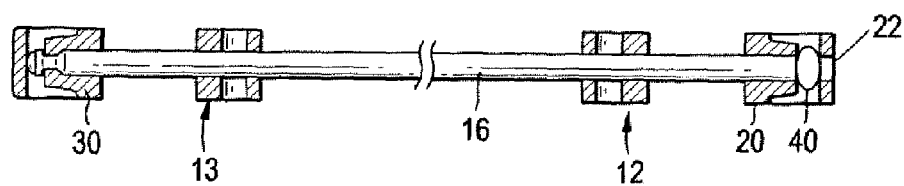
FIG. 10 is a partial cross-sectional view of the conveyor belt of FIG. 1, showing the retention of the pivot rod by the first and second edge extensions.

FIG. 10 shows a partial cross-sectional view of the link elements 12 and 13, with the pivot rod 16 being retained therebetween. The button head 40 of the pivot rod 16 is sized to pass through the outer opening 22 of the first edge extension 20 when in a certain orientation, and be received in the first edge extension 20 in the manner shown upon rotation. In particular, in order for the button head 40 of the pivot rod 16 to be inserted into the first edge extension 20, the button head 40 is first oriented so that the minor dimension $D_{min}$ of the button head 40 is substantially aligned with the first dimension D1 of the outer opening 22. The pivot rod 16 is then inserted through the outer opening 22, and retained in the first edge extension 20 by rotating the button head 40 (i.e. the pivot rod 16) in the first edge extension 20. The button head 40 is sufficiently rotated so that the minor dimension $D_{min}$ of the button head 40 is misaligned with the first dimension D1 of the outer opening 22. Correspondingly, the button head 40 of the pivot rod 16 can no longer pass through the opening 22 unless, of course, it is reoriented.

As also shown in FIG. 10, the pivot rod 16 has a length so that the lock mechanisms 32 and 34 engage the retention feature 44 of the pivot rod 16 when the button head 40 is received in the first edge extension 20. As shown in FIG. 7, the major dimension $D_{maj}$ of the button head 40 on the pivot rod 16 is substantially perpendicular to the flatten surfaces 48 and 49 of the retention feature 44. Correspondingly, upon rotation of the button head 40 into the retained configuration shown in FIG. 10, the lock mechanisms 32 and 34 engage the flatten surfaces 48 and 49 of the grooves 46 and 47, respectively.

Figure 11:
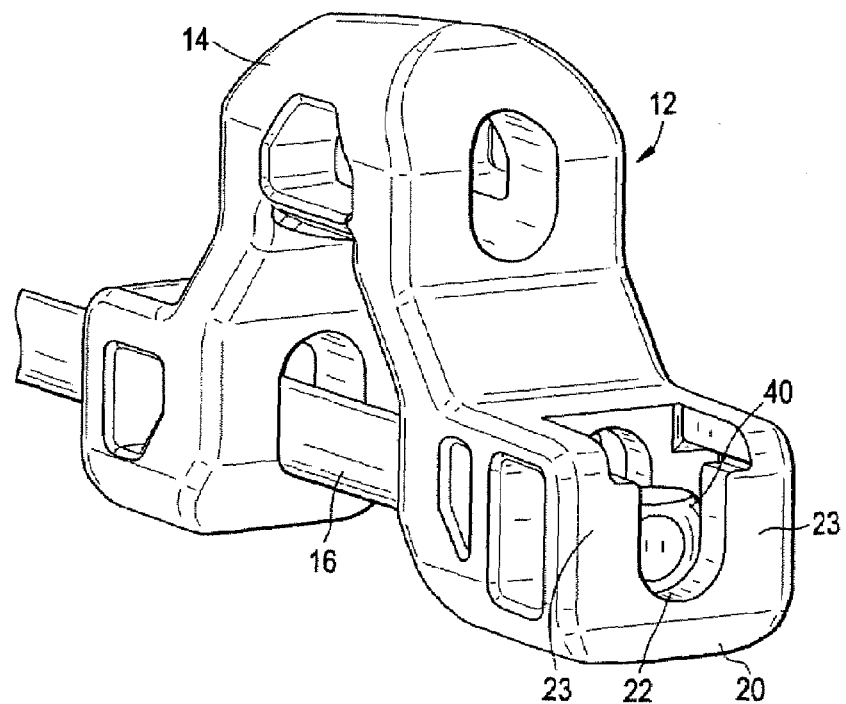
FIG. 11 is a perspective view of the button head retained in the first edge extension in accordance with one example implementation.
Figure 12:
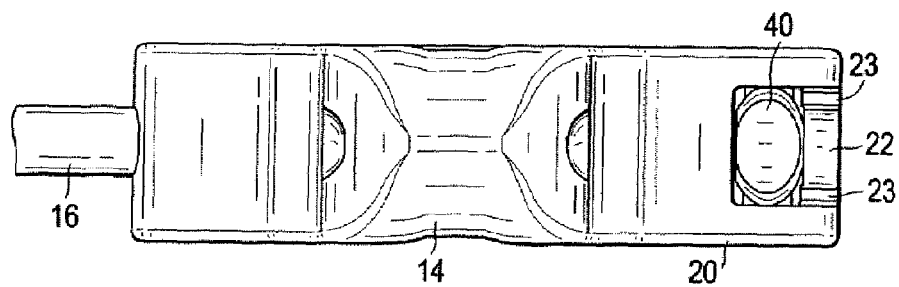
FIG. 12 is a front view of the button head retained in the first edge extension as shown in FIG. 11.

In the above regard, FIGS. 11 and 12 are perspective and front views of the button head 40 received and retained in the first edge extension 20. As can be clearly seen in these figures, upon rotation of the pivot rod 16 after insertion thereof into the first edge extension 20, the button head 40 is oriented so as to be retained by the edge walls 23 of the first edge extension 20, the button head 40 being too large in the illustrated orientation to fit through the outer opening 22, thus, maintaining the installed position of the pivot rod 16.

Figure 13:
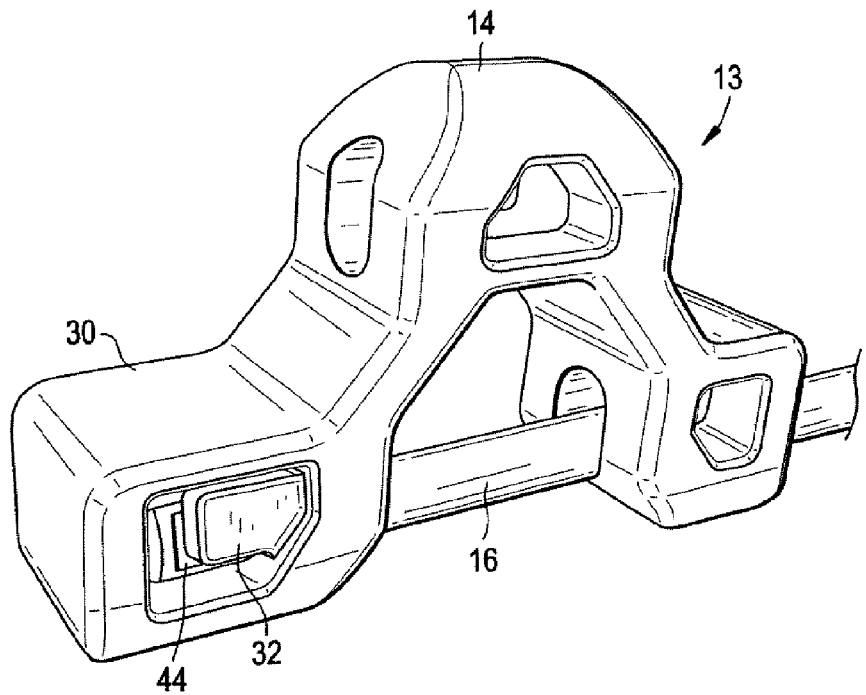
FIG. 13 is a perspective view of the retention feature being engaged by the lock mechanisms of the second edge extension in accordance with one implementation.

The lock mechanisms 32 and 34 of the present embodiment engage the grooves 46 and 47 of the pivot rod 16 to also resist transverse movement of the pivot rod 16. In addition, the engagement of the lock mechanisms 32 and 34 further resist the rotation of the pivot rod 16 so that the orientation of the button head 40 as shown in FIGS. 10 to 12 is maintained. FIG. 13 shows the engagement of the lock mechanisms 32 and 34 of the second edge extension 30 with the groove 46 (and 47 not shown) to thereby prevent further rotation of the pivot rod 16 relative to the link element 13. Thus, the engagement between the lock mechanisms 32 and 34, and the retention feature 44 prevents rotation of the button head 40 into an orientation where the minor dimension $D_{min}$ of the button head 40 is aligned with the first dimension D1 of the outer opening 22. Correspondingly, the likelihood of unintentional removal of the pivot rod 16 during operation of the conveyor belt 10 is greatly reduced. However, the grooves 46 and 47 do allow fore and aft movement of the pivot rod relative to the second edge extension 30 thereby allowing collapsing of the conveyor belt 10 in the present embodiment.

Figure 14:
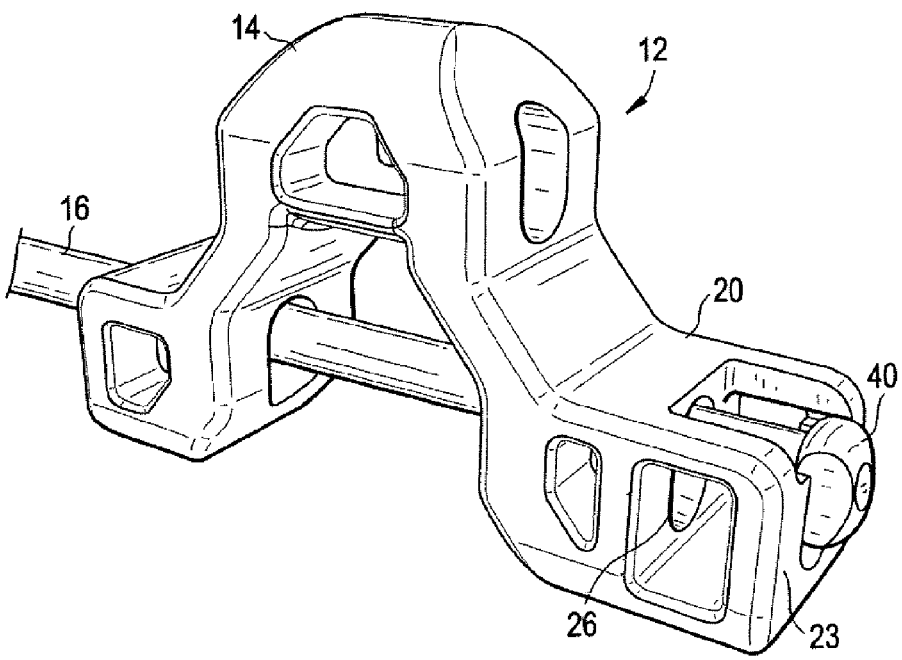
FIG. 14 shows the aligned orientation and insertion of the button head relative to the outer opening of the first edge extension.

It should also be evident to one of ordinary skill in the art that another aspect of the present invention is a method of assembling a conveyor belt. Referring to FIG. 14, the method includes inserting the pivot rod 16 into the outer opening 22 of the first edge extension 20, thereby interlinking the intermeshed extensions of adjacent link elements. The button head 40 of the pivot rod 16 is oriented as shown in FIG. 14 such that the minor dimension $D_{min}$ is substantially aligned with the first dimension D1 of the outer opening 22, and the button head 40 can be passed through the outer opening 22 and be received in the first extension 20 as shown in FIG. 15.

Figure 15:
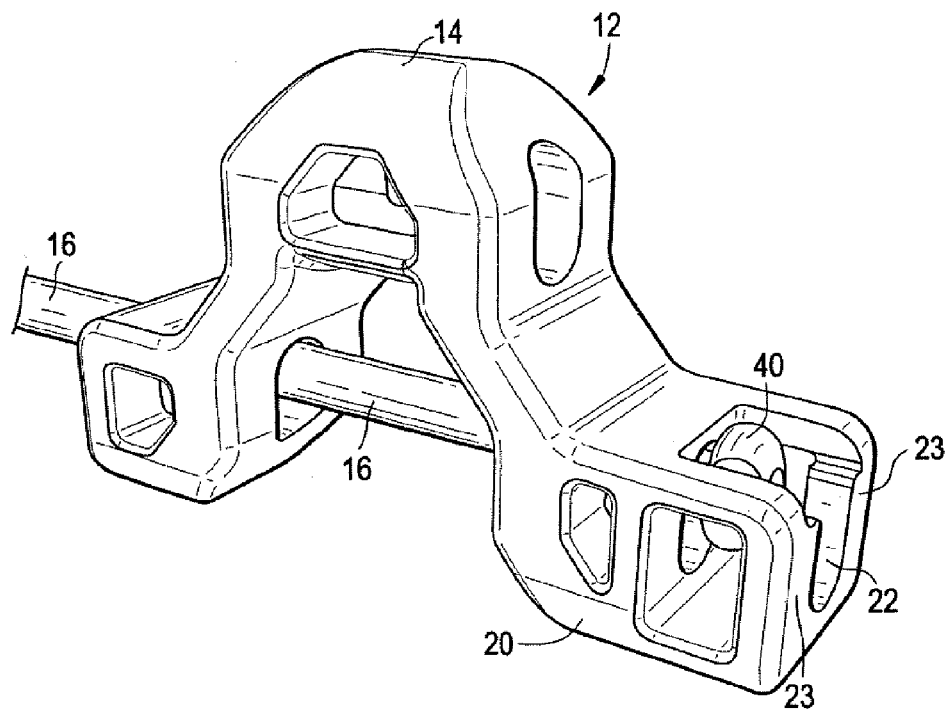
FIG. 15 shows further insertion of the pivot rod of FIG. 14 so that the button head is received in the first edge extension.
Figure 16:
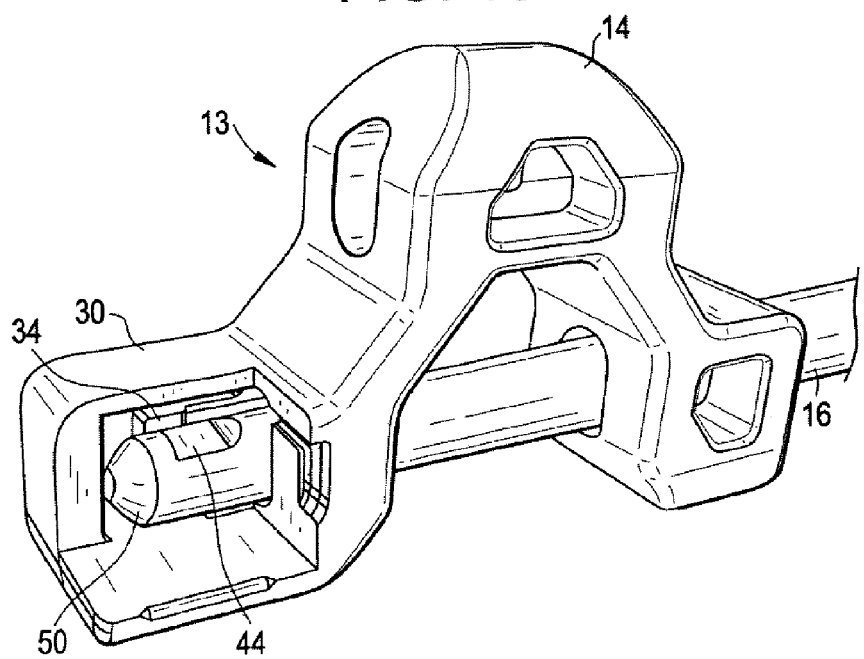
FIG. 16 is a partial sectional view of the pivot rod that is inserted into the second edge extension whereby the lock mechanisms are expanded to receive the pivot rod therebetween.

The pivot rod 16 is implemented to have a length dimension such that when the pivot rod 16 is inserted to the position shown in FIG. 15 with the button head 40 received in the first edge extension 20, the opposite end of the pivot rod 16 is inserted into the second edge extension 30 of link element 13 as shown in FIG. 16 that illustrates a partial cut away view of the second edge extension 30 for clarity. The chamfer 50 provided on the tip of the pivot rod 16 facilitates spreading or deflection of the lock mechanism 34 (as well as lock mechanism 32, not shown) so that the end of the pivot rod 16 is received between the lock mechanisms in the manner shown in FIG. 16.

Figure 17:
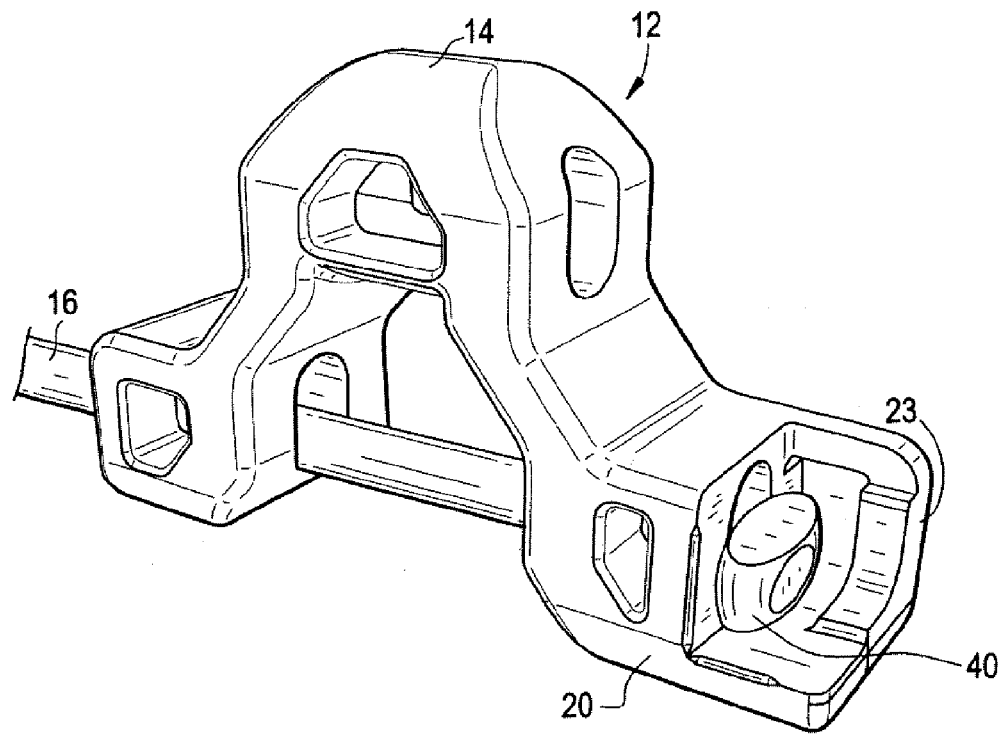
FIG. 17 is a partial sectional view of the pivot rod rotated in the first edge extension so that the button head is misaligned relative to the outer opening of the first edge extension.

The pivot rod 16 is then rotated as shown in FIG. 17 so that the minor dimension $D_{min}$ of the button head 40 is not aligned with the first dimension D1 of the outer opening 22. Thus, the button head 40 of the pivot rod 16 cannot fit through the outer opening 22 due to the dimensional differences of the button head 40 in the shown orientation, and the outer opening 22. This retention of the button head 40 in the first edge extension 20 is most clearly shown in the enlarge end view of FIG. 18.

Figure 18:
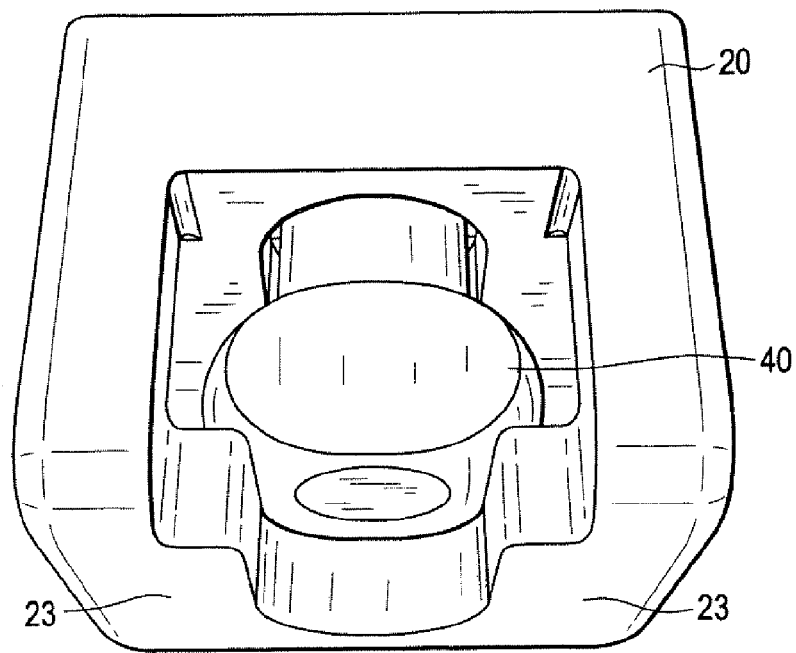
FIG. 18 is an enlarged perspective view of the button head received in the first edge extension and oriented to be misaligned relative to the outer opening.
Figure 20:
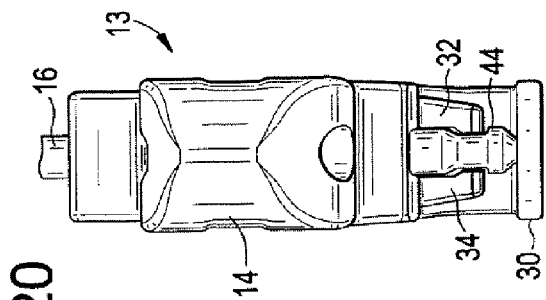
FIG. 20 is a partial sectional frontal view of the second edge extension shown in FIG. 19.
Figure 19:
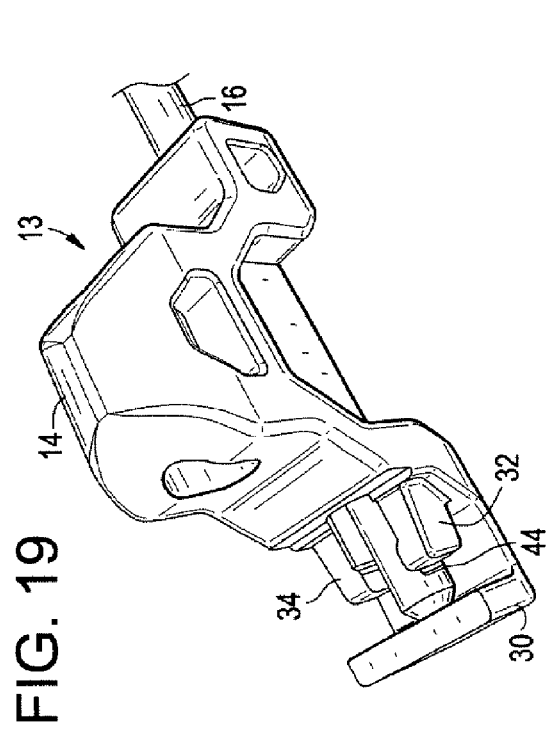
FIG. 19 is a partial sectional perspective view of the second edge extension with the lock mechanisms engaging the grooves of the retention feature provided on the pivot rod.

Furthermore, the rotation of the pivot rod 16 so that the button head 40 is in the orientation shown in FIGS. 17 and 18, causes the lock mechanisms 32 and 34 to engage the grooves 46 and 47 of the pivot rod 16 in the manner shown in FIGS. 19 and 20, both figures showing partial cut away views for clarity purposes. The lock mechanisms 32 and 34 deflect back to their substantial undeflected position, or thereabouts, to engage the grooves 46 and 47 of the pivot rod 16, respectively. In addition, because the grooves 46 and 47 are implemented with flatten surfaces 48 and 49, they resist further rotation of the pivot rod 16, thereby maintaining the orientation of the button head 40 in the manner shown in FIGS. 17 and 18. This ensures that the pivot rod 16 is properly retained so that unintentional removal of the pivot rod 16 during operation of the conveyor belt 10 can be avoided. Further, as previously noted, it should be evident that a different number of lock mechanisms may be provided to engage the retention feature of the pivot rod 16.

Thus, the method includes orienting the button head to a particular position relative to the outer opening, inserting the pivot rod in the transverse rod openings, and passing the button head of the pivot rod through the outer opening so that the button head is received in the first edge extension. In addition, the method includes rotating the orientation of the pivot rod relative to the first edge extension such that the button head no longer fits through the outer opening. Moreover, the method also includes resisting further rotation of the pivot rod, for example, by engaging the pivot rod with a lock mechanism.

As can be also appreciated by examining FIGS. 19 and 20, the above-described lock mechanisms 32 and 34 that engage the retaining feature 44 allows the pivot rod 16 to slide fore and aft between the lock mechanisms 32 and 34 in the second edge extension 30 while still being engaged to resist further rotation of the pivot rod 16. This is especially advantageous and allows the pivot rod 16 to move fore and aft in the slotted transverse openings 26 to facilitate collapse/nesting of the link elements relative to one another so that the conveyor belt 10 can negotiate turns, or be implemented in a spiral storage conveyor.

Figure 21:
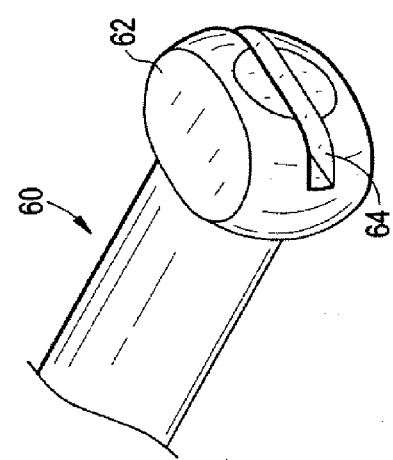
FIG. 21 is a perspective view of a button head having a tool feature in accordance with one example implementation.

To facilitate the rotation of the pivot rod 16 when the button head 40 is received in the first edge extension 20, the button head 40 may be provided with a tool engagement feature. In this regard, FIG. 21 shows a pivot rod 60 in accordance with another embodiment that includes button head 62 having a slot 64 sized to receive a flat tipped screwdriver. The pivot rod 60 can be rotated by engaging the tip of the screwdriver into the slot 64, and rotating the pivot rod 60 until the retention feature is engaged by the lock mechanism to resist further rotation of the pivot rod 60 and prevent unintentional removal of the pivot rod 60.

Figure 22:
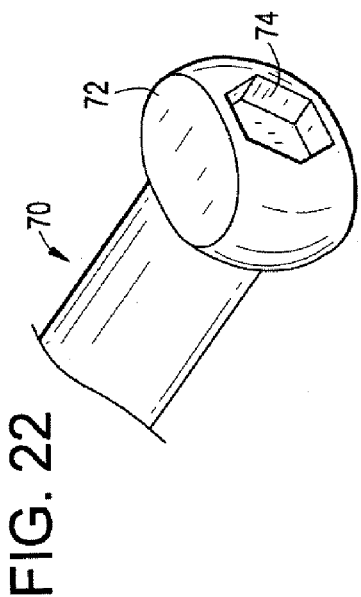
FIG. 22 is a perspective view of a button head having a tool feature in accordance with another example implementation.

FIG. 22 shows yet another embodiment of a pivot rod 70 that includes a button head 72 with an allen head receiver 74 sized to receive a correspondingly sized allen wrench for rotating the pivot rod 70 to the orientation desired, for example, to rotate the pivot rod 70 until a lock mechanism engages a retention feature.

Figure 23:
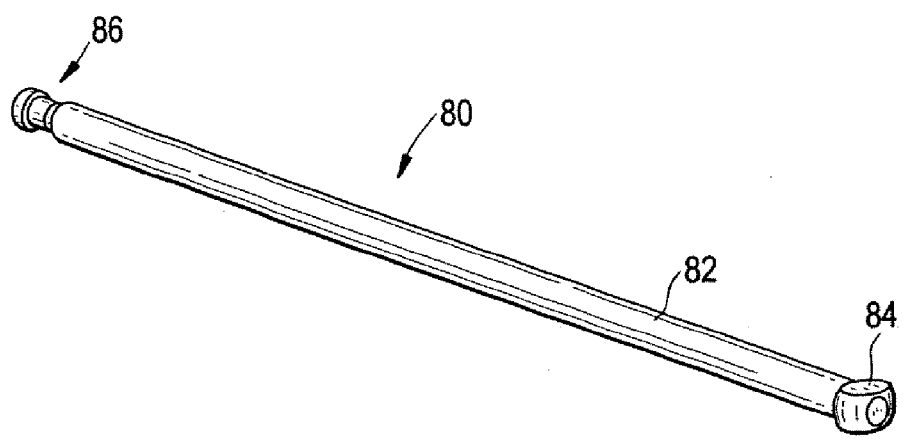
FIG. 23 is a perspective view of a pivot rod in accordance with still another implementation.

FIG. 23 shows a pivot rod 80 in accordance with yet another embodiment of the present invention. In this embodiment, the pivot rod 80 includes an elongated shank 82 with a button head 84 that may be implemented in the manner previously described above relative to the embodiment shown in FIG. 7. In addition, the pivot rod 80 is further provided with a retention feature 86 that is engaged by the lock mechanism of a corresponding second edge extension such as that shown in FIG. 5. In the illustrated embodiment, the retention feature 86 is implemented as an annular channel that circumscribes the circumference of the pivot rod 80. Thus, a flat surface is not provided, and the lock mechanisms that engage the retention feature 86 do not resist rotation of the pivot rod. Of course, the lock mechanisms that engage the retention feature 86 still act to resist transverse movement of the pivot rod 80 so that unintentional removal of the pivot rod 80 is less likely.

Figure 24:
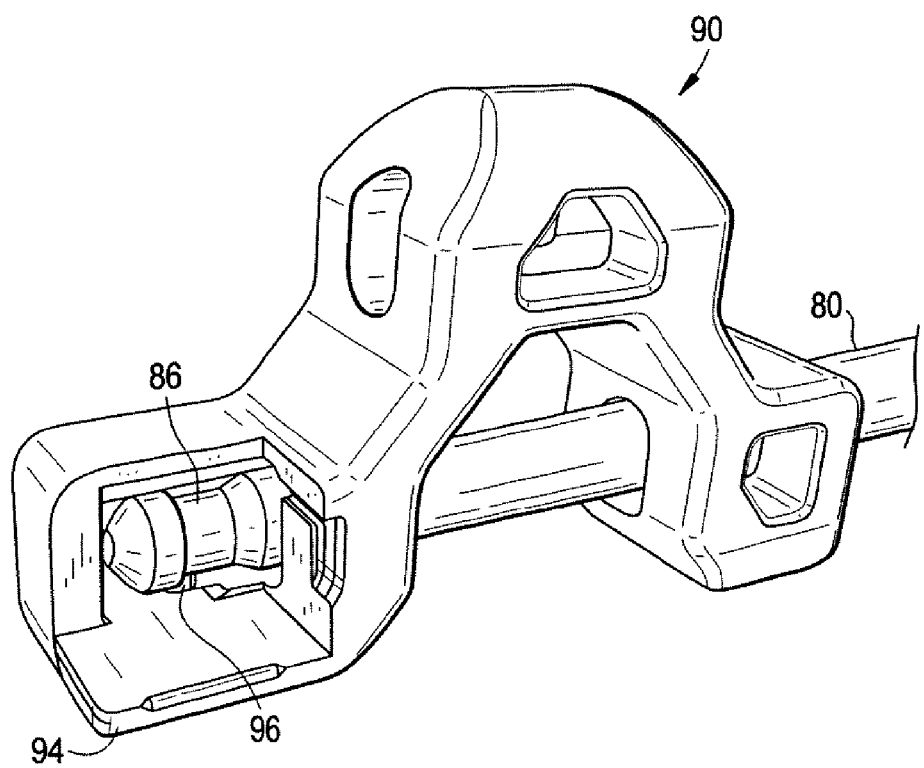
FIG. 24 shows the insertion and retention of the pivot rod of FIG. 23 in a second edge extension.

FIG. 24 is a partial sectional view of link element 90 having a second edge extension 94 in which the pivot rod 80 as shown in FIG. 23 is received. As can be seen, the retention feature 86 is engaged by the lock mechanism 96 so as to resist transverse movement of the pivot rod 80. The illustrated embodiment also allows the pivot rod 80 to slide fore and aft in the direction of conveyor operation, while being engaged by the lock mechanism 96 (only one being shown for clarity).

As previously noted, the geometric shape of the button head can be implemented differently than that shown, for example, in FIGS. 7 to 9. In this regard, the button head may have any appropriate shape which allows it to function in the manner previously described where the button head has a major dimension and a minor dimension so that the button head is aligned with outer opening of the first edge extension, inserted through the outer opening, and rotated so as to misalign the minor dimension so that the button head is retained in the first edge extension. In this regard, FIGS. 25 to 27 discussed in further detail below illustrate various different embodiments of the button head which may be utilized in a conveyor belt in accordance with the present invention. It should be noted that these various embodiments function in substantially the same manner as that described above relative to FIGS. 14 to 18.

Figure 25:
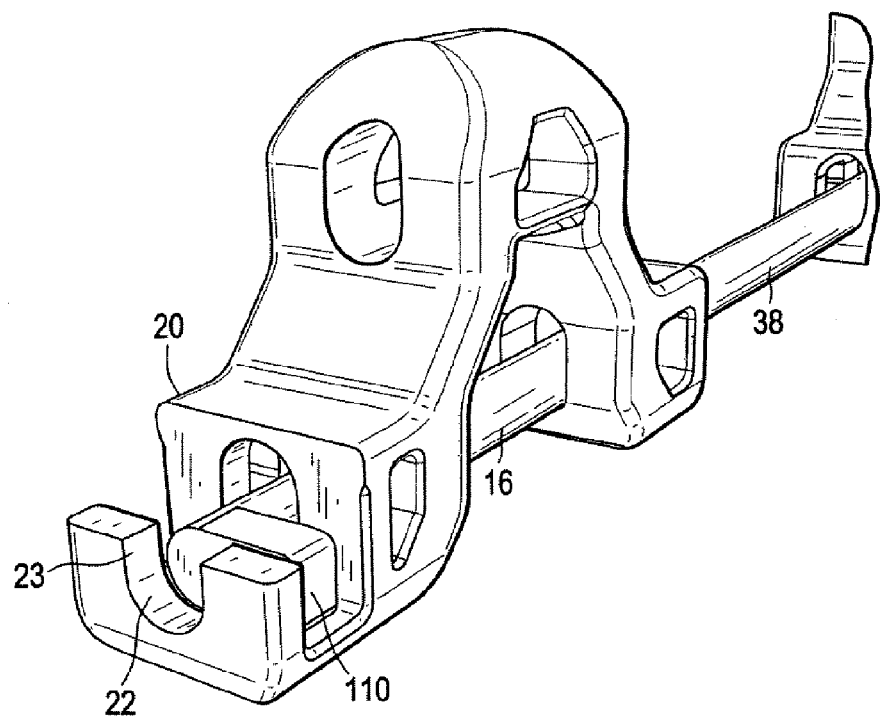
FIG. 25 is a perspective view of a button head in accordance with another embodiment which is received in the first edge extension and oriented to be misaligned relative to the outer opening.

FIG. 25 is a perspective view of a button head 110 of the pivot rod 16 in accordance with another embodiment which is received in the first edge extension 20, only a partial sectional view of the first edge extension 20 being shown. As can be seen, in the illustrated embodiment, the button head 110 is implemented with a rectangular shape. Moreover, in the illustrated embodiment, the button head 110 is eccentrically positioned relative to the elongated shank 38 of the pivot rod 16 so that one end of the rectangular button head 110 is attached to the end of the elongated shank 38. Thus, the $D_{min}$ of the button head 110 is the width of the button head, while the $D_{maj}$ is the length of the button head.

In use, the button head 110 is initially positioned so that $D_{min}$ of the button head 110 is aligned with the opening 22 so that it can be passed therethrough. The button head 110 is then rotated or oriented so that the button head 110 is no longer aligned with the opening 22, and is retained in the first edge extension by the edge walls 23 as clearly shown in FIG. 25. Of course, a retention feature that may be provided on the pivot rod which is engaged by the lock mechanism in the second edge extension may be implemented in the same, or similar, manner as described previously. Thus, discussion thereof is omitted to avoid repetition.

Figure 26:
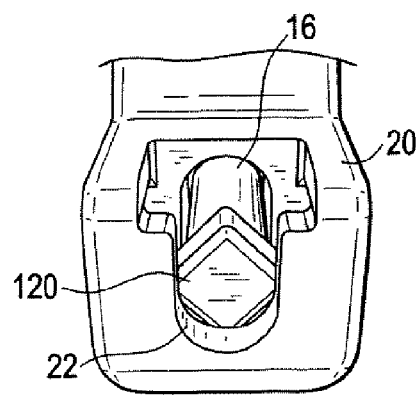
FIG. 26 is a perspective view of a button head in accordance with still another embodiment which is received in the first edge extension and oriented to be misaligned relative to the outer opening.

FIG. 26 is a perspective view of a button head 120 in accordance with still another embodiment which is received in the first edge extension 20. As can be seen, in the illustrated embodiment, the button head 120 is implemented to have a square shape. In the present embodiment, the $D_{min}$ of the button head 120 is the width of the button head between the flat sides thereof, while the $D_{maj}$ is the diagonal length of the button head between the corners thereof. In use, the button head 120 is initially positioned so that the sides of the button head 120 are aligned with the opening 22 so that it can be passed therethrough. The button head 120 is then rotated or oriented so that the sides of the button head 120 are no longer aligned with the opening 22, as clearly shown in FIG. 26, so that the button head 120 is retained by the corners of the button head 120.

Figure 27:
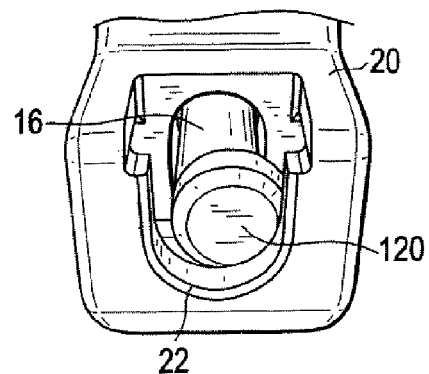
FIG. 27 is a perspective view of a button head in accordance with yet another embodiment which is received in the first edge extension and oriented to be misaligned relative to the outer opening.

FIG. 27 is a perspective view of a button head 130 in accordance with yet another embodiment which is received in the first edge extension 20. As can be seen, in the illustrated embodiment, the button head 130 is implemented with a circular shape that is eccentrically positioned relative to the elongated shank of the pivot rod 16 so that one end of the circular button head 130 is attached to the end of the elongated shank. In the present embodiment, even though the button head 130 does not include maximum and minimum dimensions, the button head 130 can be used in the manner described above to retain the pivot rod 16 because of the eccentric positioning of the button head 130 relative to the elongated shank. In particular, in use, the button head 130 is initially positioned so that the eccentrically positioned circular button head 130 is oriented to pass through the opening 22. The button head 130 is then rotated or oriented so that the cam lobe-like portion of the button head that extends beyond the surface of the elongated shank is no longer aligned with the opening 22. Correspondingly, when in this misaligned position, the cam lobe-like portion of the button head 130 retains the pivot rod 16 in the manner clearly shown in FIG. 27.

Figure 28:
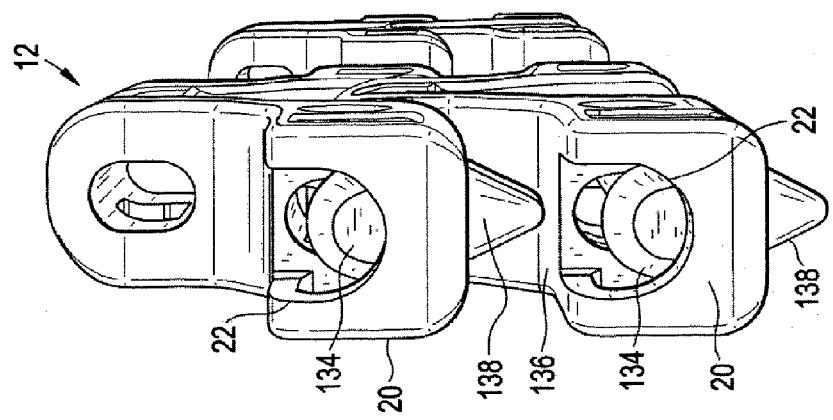
FIG. 28 is a perspective view of a pair of link elements that are being intermeshed together in accordance with another example implementation of the present invention.

FIG. 28 is a perspective view of a pair of link elements 12 that are in the process of being intermeshed together in accordance with another example implementation of the present invention. In the present embodiment, the first edge extensions 20 are provided with openings 22 that are sized to allow the elongated shank of the pivot rod to be inserted, and to allow the button head 134 to pass therethrough so that it can be received in the first edge extensions 20. As can be seen, the button head 134 is circular, and in the present embodiment, is coaxial with the elongated shank of the pivot rod. Thus, the button head 134 does not have a major dimension or a minor dimension in the manner described in the previous embodiments.

Figure 29:
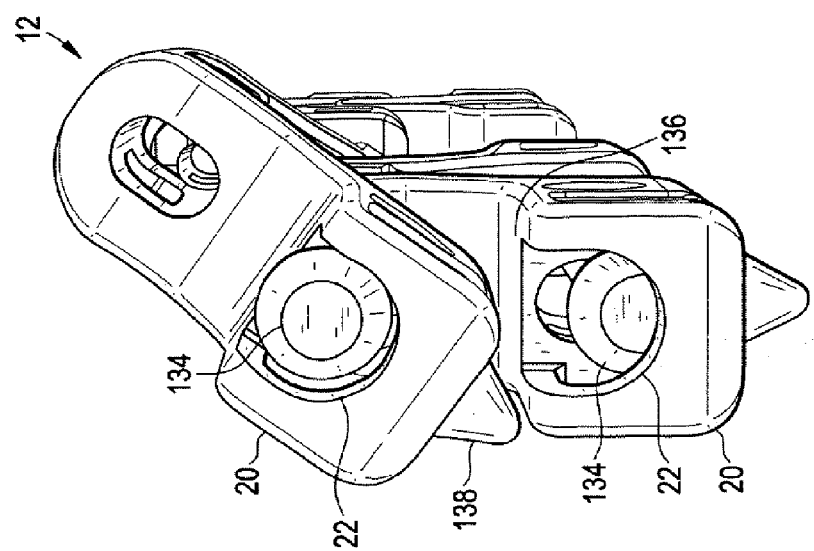
FIG. 29 is a perspective view of the pair of link elements of FIG. 28 intermeshed together.

Instead, the retention of the pivot rod is attained by providing an extension 138 on the trailing end of the first edge extension 20 that engages support surface 136 of the first edge extension 20 of an adjacent link element in the manner shown in FIG. 29. Because the extension 138 contacts the support surface 136, the adjacent link elements 12 are pushed away from each other until reaching the apex of the extensions 138 when the adjacent link elements are rotated to be coplanar in the operating position as shown in FIG. 29. Thus, the link elements are in an extended configuration when rotated to be coplanar. Correspondingly, the pivot rods move within the slotted openings of the link elements and the button head 134 of the pivot rods become misaligned with respect to the opening 22, thereby preventing the button head 134, and the pivot rod, from unintentionally being removed. Of course, it should be noted that whereas in the present embodiment, an extension 138 is utilized to place the link elements in the extended configuration, any appropriate feature or mechanism may be used to attain this result and to prevent nesting of the adjacent link elements.

As can also be appreciated, the insertion and the removal of the button head 134, and correspondingly, the pivot rod, can only be attained by pivoting the link element in the manner shown in FIG. 28 so that the button head 134 can be realigned with the opening of the first edge extension 20. A significant advantage of the present embodiment is that the button head may be completely symmetrical and coaxial with the elongated shank of the pivot rod, thereby minimizing manufacturing costs. However, a disadvantage of the discussed embodiment of FIGS. 28 and 29 is that the extension 138 prevents, or substantially limits, nesting or collapsing of the conveyor belt at the edge in which such a feature is provided.

Figure 30:
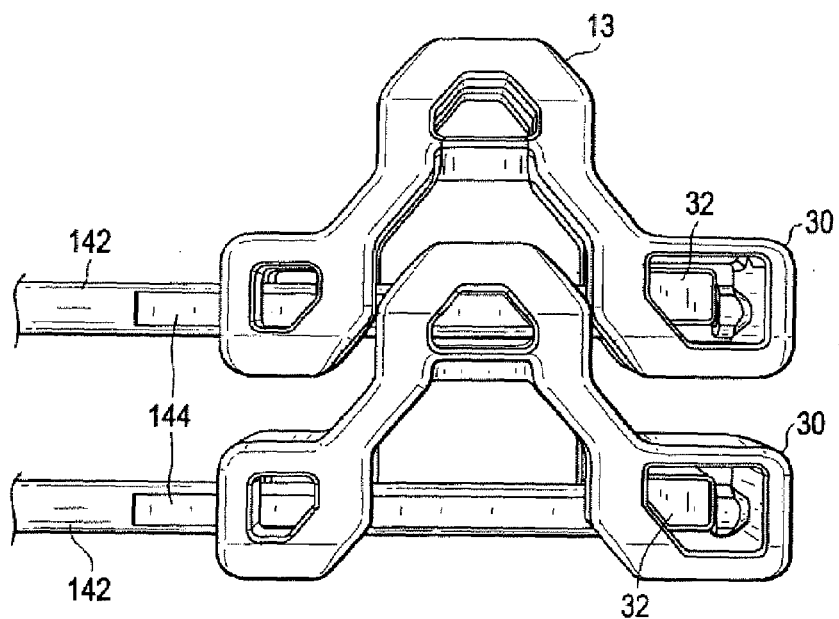
FIG. 30 is a topographical view of pivot rods in accordance with another embodiment of the present invention that are used to interconnect link elements together.
Figure 31:
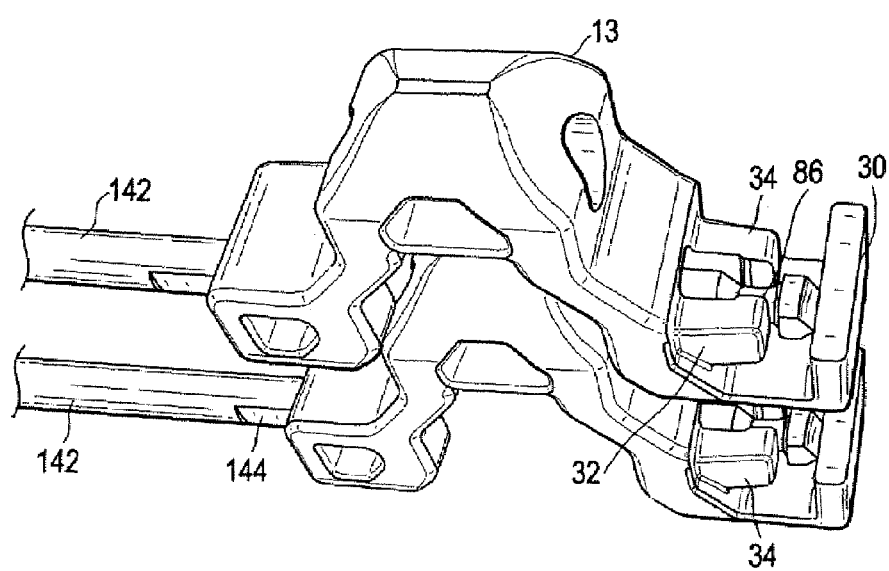
FIG. 31 is a partial sectional view of the pivot rods of FIG. 30 which is retained by second edge extensions.
Figure 32:
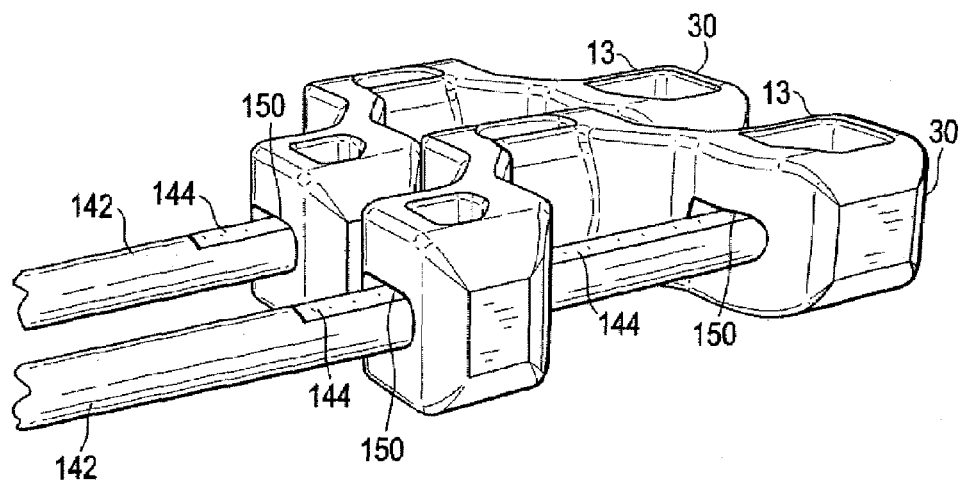
FIG. 32 is a back perspective view of the pivot rods of FIG. 30.

FIGS. 30 to 32 show various views of pivot rods 142 in accordance with another embodiment of the present invention that are used to interconnect link elements 13 together. The pivot rods 142 of the illustrated embodiment are each provided with a groove at an end opposite the button head in a similar manner to that shown in the pivot rod of FIG. 23. The pivot rods 142 may be engaged by lock mechanisms 32 and 34 that are provided in the second edge extensions 30 in the manner previously described, as most clearly shown in the partial sectional view of FIG. 31.

However, in the present embodiment, each pivot rod 142 is also provided with an extended flat 144 toward the end thereof, the extended flat 144 being preferably positioned to be perpendicular to the major dimension of the button head. The extended flat 144 is thus, implemented so that the pivot rod 142 has a substantially "D" shaped cross-section. Of course, in other embodiments, the pivot rod 142 may be implemented to have any practical, non-circular cross sectional shape, for example, square, rectangular, oval, etc. In the present embodiment, the extended flat 144 is also implemented so that the cross-sectional height of the pivot rod 142 across the extended flat 144 correspond to the height dimension of the slotted opening 150 of the link element 13, as most clearly shown in FIG. 32. Thus, because of this closely corresponding dimensions of the slotted opening 150 and the pivot rod 142 along the extended flat 144, the pivot rod 142 is rotationally interlocked with the link element 13 so that they can only rotate together.

In use, the button head (not shown) provided on the opposite end of the pivot rod 142, is oriented to allow insertion thereof into the elongated recess of the first edge extension (not shown), and the pivot rod is inserted through the first edge extension in the manner described above relative to the previously discussed embodiments. Because of the orientation of the extended flat 144 relative to the button head of the pivot rod, the link element 13 with the second edge extension 30 must be oriented perpendicular to the orientation of the first edge extension. In such orthogonal orientation, the pivot rod 142 can be inserted further so that the button head is received through the opening of the first edge extension, and the opposing end of the pivot rod with the extended flat 144 can be received in the slotted opening 150 of the link element 13 until the groove of the pivot rod 142 is engaged by lock mechanisms 32 and 34 of the second edge extension 30.

When the link element 13 is then pivoted to be coplanar with the other link elements of the conveyor belt, the pivot rod 142 is also rotated since it is rotationally interlocked to the link element 13 by the virtue of the dimensions of the extended flats 144 and the slotted opening 150 as described above. This rotation of the pivot rod 142 also correspondingly rotates the button head that is provided on the opposite end of the pivot rod 142 so that it is no longer aligned with the opening, thereby retaining the first edge extension and the pivot rod so as to prevent unintentional removal thereof.

Figure 33:
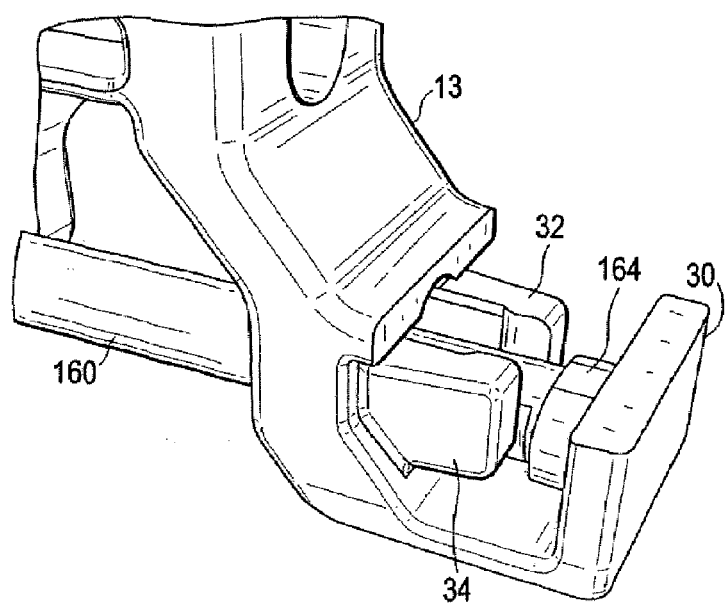
FIG. 33 is a partial sectional view of a pivot rod in accordance with yet another embodiment of the present invention that is received in a second edge extension.
Figure 34:
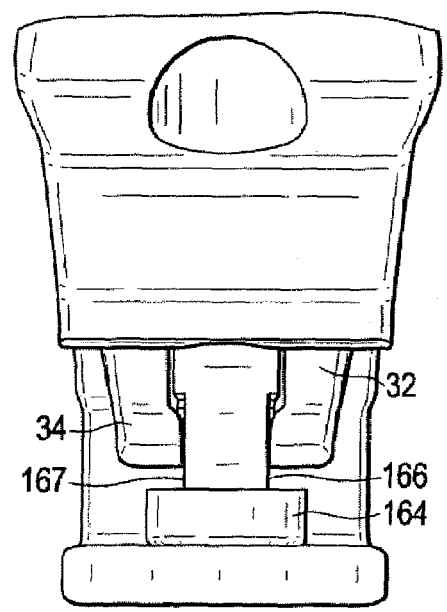
FIG. 34 is a frontal view of the pivot rod of FIG. 33.
Figure 35:
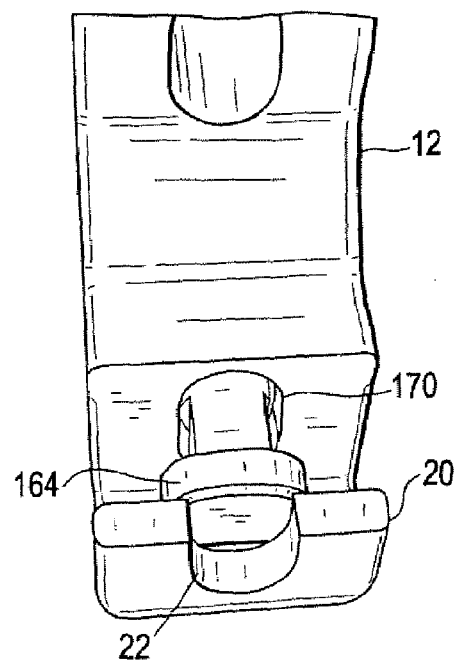
FIG. 35 is a partial sectional view of the pivot rod of FIG. 33 that is received in a first edge extension.

FIGS. 33 to 35 show various views of a pivot rod 160 in accordance with yet another embodiment of the present invention. FIGS. 33 and 34 shows the pivot rod 160 received in a second edge extension 30 of link element 13, a partial cross section being shown for clarity. FIG. 35 shows the opposite end of the pivot rod 160 that is received in a first edge extension 20 of the link element 12, a partial cross section also being shown for clarity purposes. As described in detail below, the pivot rod 160 of the present embodiment is provided with both, a button head 164, and grooves 166 and 167, at both ends thereof.

In particular, as shown in FIGS. 33 and 34, the grooves 166 and 167 of one end of the pivot rod 160 are engaged by lock mechanisms 32 and 34, respectively, which are provided in the second edge extension 30 in the manner previously described. The button head 164, which is elliptical in shape in the present embodiment, is sized to fit through the slotted openings of the link elements used in the conveyor belt. In this regard, as clearly shown in FIG. 35 which shows a partial sectional view of the first edge extension 20 of link element 12, the first edge extension 20 is implemented with an opening 22 to allow insertion of the pivot rod 160. In addition, because the button head 164 is provided on both ends of the pivot rod 160, the slotted opening 170 of the link elements used in the conveyor belt is sized to allow the button head 164 to pass therethrough in one orientation.

Thus, in use, the pivot rod 160 is oriented so that the button head 164 can be inserted through the opening 22 of the first edge extension 20, through the slotted openings of the link elements used in the conveyor belt, and through the lock mechanisms 32 and 34 provided on the second edge extension 30 of the link element 13. The pivot rod 160 is then rotated so that the lock mechanisms 32 and 34 engage the grooves 166 and 167, respectively in the manner previously described. Upon such rotation, the button head 164 on the opposite end of the pivot rod 160, which is received in the opening 22 of the first edge extension 20, is misaligned with the opening 22, so that unintentional removal of the pivot rod 160 is avoided. Providing a pivot rod 160 with both, a button head 164, and grooves 166 and 167, at both ends thereof, allows both ends of the pivot rods to be manufactured identically. In addition, this embodiment also facilitates installation in that either end of the pivot rod 160 can be installed first.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A conveyor belt comprising:
a plurality of link elements, each link element having intermeshing extensions sized to intermesh with intermeshing extensions of an adjacent link element, said intermeshing extensions having transverse rod openings;
a pivot rod received in said transverse rod openings of said plurality of intermeshing extensions thereby interconnecting adjacent intermeshed link elements together, said pivot rod extending transversely from said transverse rod openings to provide a surface for a continuous conveyor belt used to convey objects from one location to another, said pivot rod including a button head at one end, said button head having a major dimension and a minor dimension, said major dimension being larger than said minor dimension; and
a first edge extension having an outer opening with a first dimension that is smaller than said major dimension of said button head but larger than said minor dimension of said button head so that said button head of said pivot rod passes through said outer opening when said minor dimension of said button head is substantially aligned with said first dimension of said outer opening;
wherein said pivot rod is retained by rotating said button head received in said first edge extension so that said minor dimension of said button head is misaligned with said first dimension of said outer opening.

2. The conveyor belt of claim 1, wherein said outer opening is positioned on said first edge extension so that said first dimension is substantially parallel to said conveyor belt when said conveyor belt is in an operating configuration.

3. The conveyor belt of claim 1, wherein said outer opening is a slot open toward a leading direction of said conveyor belt.

4. The conveyor belt of claim 1, further comprising a second edge extension including at least one lock mechanism that engages said pivot rod.

5. The conveyor belt of claim 4, wherein said pivot rod includes a retention feature, said at least one lock mechanism engaging said retention feature to resist rotation of said pivot rod.

6. The conveyor belt of claim 5, wherein said retention feature includes at least one groove.

7. The conveyor belt of claim 6, wherein said pivot rod has a length so that said at least one lock mechanism engages said at least one groove of said pivot rod when said button head is received in said first edge extension.

8. The conveyor belt of claim 6, wherein said at least one groove includes a pair of flattened surfaces diametrically opposed to one another on said pivot rod.

9. The conveyor belt of claim 8, wherein said at least one lock mechanism is a pair of opposing lock mechanisms, the lock mechanisms being resiliently spread apart to engage said flattened surfaces of said pivot rod.

10. The conveyor belt of claim 6, wherein said at least one groove includes a flattened surface, said at least one lock mechanism engaging said flattened surface to thereby retain the transverse position of the elongated rod along the width of the conveyor belt.

11. The conveyor belt of claim 4, wherein said at least one lock mechanism allows said pivot rod to slide fore and aft in a direction of conveyor operation.

12. The conveyor belt of claim 4, wherein said at least one lock mechanism is a resilient cantilevered member extending in said second edge extension, said at least one lock mechanism deflecting to engage said pivot rod.

13. The conveyor belt of claim 6, wherein said at least one groove includes a flattened surface, said major dimension of said button head on said pivot rod being substantially perpendicular to said flattened surface.

14. The conveyor belt of claim 1, wherein at least some of said transverse rod openings are slotted openings to allow said plurality of link elements of said conveyor belt to be nested together.

15. A conveyor belt comprising:
a plurality of link elements, each link element having intermeshing extensions sized to intermesh with intermeshing extensions of an adjacent link element, said intermeshing extensions having slotted transverse rod openings;
a pivot rod received in said transverse rod openings of said plurality of intermeshing extensions thereby interconnecting adjacent intermeshed link elements together, said pivot rod including a button head at one end, said button head having a major dimension and a minor dimension, said major dimension being larger than said minor dimension, and at least one retention feature at another end;
a first edge extension having an outer opening with a first dimension that is smaller than said major dimension of said button head but larger than said minor dimension of said button head so that said button head is inserted in said first edge extension by substantially aligning said minor dimension of said button head with said first dimension of said outer opening, and retained in said first edge extension by misaligning said button head relative to said outer opening; and
a second edge extension including at least one lock mechanism that engages said retention feature of said pivot rod.

16. The conveyor belt of claim 15, wherein said retention feature includes at least one groove with a flattened surface, said major axis of said button head on said pivot rod being oriented substantially perpendicular to said flattened surface.

17. The conveyor belt of claim 15, wherein said outer opening is positioned on said first edge extension so that said first dimension is substantially perpendicular to said conveyor belt when said conveyor belt is in an operating configuration.

18. The conveyor belt of claim 15, wherein said at least one retention feature includes a pair of grooves with flattened surfaces diametrically opposed to one another on said pivot rod.

19. The conveyor belt of claim 15, wherein said at least one lock mechanism allows said pivot rod to slide fore and aft in a direction of conveyor operation while engaging said at least one groove to resist rotation of said pivot rod.

20. The conveyor belt of claim 15, wherein said at least one lock mechanism is a resilient cantilevered member extending in said second edge extension, said at least one lock mechanism deflecting to engage said pivot rod.

21. A conveyor belt comprising:
a plurality of link elements, each link element having intermeshing extensions sized to intermesh with intermeshing extensions of an adjacent link element, said intermeshing extensions having transverse rod openings;
a pivot rod received in said transverse rod openings of said plurality of intermeshing extensions to interconnect adjacent intermeshed link elements together, said pivot rod extending transversely from said transverse rod openings to provide a surface for a continuous conveyor belt used to convey objects from one location to another;
a button head at an end of said pivot rod, said button head having a protruding portion that extends beyond an outer peripheral surface of said pivot rod; and
a first edge extension having an outer opening, said outer opening being sized to allow said button head to be inserted into said first edge extension when said button head is aligned with said outer opening, and being sized to prevent removal of said button head from said first edge extension when of said button head is misaligned with said outer opening to thereby prevent removal of said pivot rod.

22. The conveyor belt of claim 21, further comprising a second edge extension including at least one lock mechanism that engages said pivot rod.

23. The conveyor belt of claim 22, wherein said pivot rod includes a retention feature, said at least one lock mechanism engaging said retention feature to resist rotation of said pivot rod.

24. The conveyor belt of claim 23, wherein said retention feature includes at least a pair of flattened surfaces diametrically opposed to one another on said pivot rod, and said at least one lock mechanism is a pair of opposing lock mechanisms, the lock mechanisms being resiliently spread apart to engage said flattened surfaces of said pivot rod.

25. The conveyor belt of claim 22, wherein said at least one lock mechanism allows said pivot rod to slide fore and aft in a direction of conveyor operation.

26. The conveyor belt of claim 21, wherein said button head is at least one of:
oval shape;
rectangular shaped;
square shaped;
circular shaped; and
eccentrically positioned relative to said pivot rod.

27. A conveyor belt comprising:
a plurality of link elements, each link element having intermeshing extensions sized to intermesh with intermeshing extensions of an adjacent link element, said intermeshing extensions having transverse rod openings;
a pivot rod received in said transverse rod openings of said plurality of intermeshing extensions to interconnect adjacent intermeshed link elements together; and
a first edge extension having an outer opening for receiving an end of said pivot rod, said first edge extension including an extension portion that contacts an adjacent first edge extension to space apart said adjacent first edge extensions, and to misalign said end of said pivot rod relative to said outer opening, thereby preventing removal of said pivot rod.

28. A conveyor belt comprising:
a plurality of link elements, each link element having intermeshing extensions sized to intermesh with intermeshing extensions of an adjacent link element, said intermeshing extensions having transverse rod openings;
a pivot rod received in said transverse rod openings of said plurality of intermeshing extensions thereby interconnecting adjacent intermeshed link elements together, wherein said pivot rod is received in at least two intermeshing extensions of the same link element, said pivot rod including a button head at one end, said button head having a major dimension and a minor dimension, said major dimension being larger than said minor dimension; and
a first edge extension having an outer opening with a first dimension that is smaller than said major dimension of said button head but larger than said minor dimension of said button head so that said button head of said pivot rod passes through said outer opening when said minor dimension of said button head is substantially aligned with said first dimension of said outer opening;
wherein said pivot rod is retained by rotating said button head received in said first edge extension so that said minor dimension of said button head is misaligned with said first dimension of said outer opening.

29. A conveyor belt comprising:
a plurality of link elements, each link element having intermeshing extensions sized to intermesh with intermeshing extensions of an adjacent link element, said intermeshing extensions having transverse rod openings;
a pivot rod received in said transverse rod openings of said plurality of intermeshing extensions to interconnect adjacent intermeshed link elements together, wherein said pivot rod is received in at least two intermeshing extensions of the same link element;
a button head at an end of said pivot rod, said button head having a protruding portion that extends beyond an outer peripheral surface of said pivot rod; and
a first edge extension having an outer opening, said outer opening being sized to allow said button head to be inserted into said first edge extension when said button head is aligned with said outer opening, and being sized to prevent removal of said button head from said first edge extension when of said button head is misaligned with said outer opening to thereby prevent removal of said pivot rod.

* * * * *